United States Patent Office 2,980,775
Patented Apr. 18, 1961

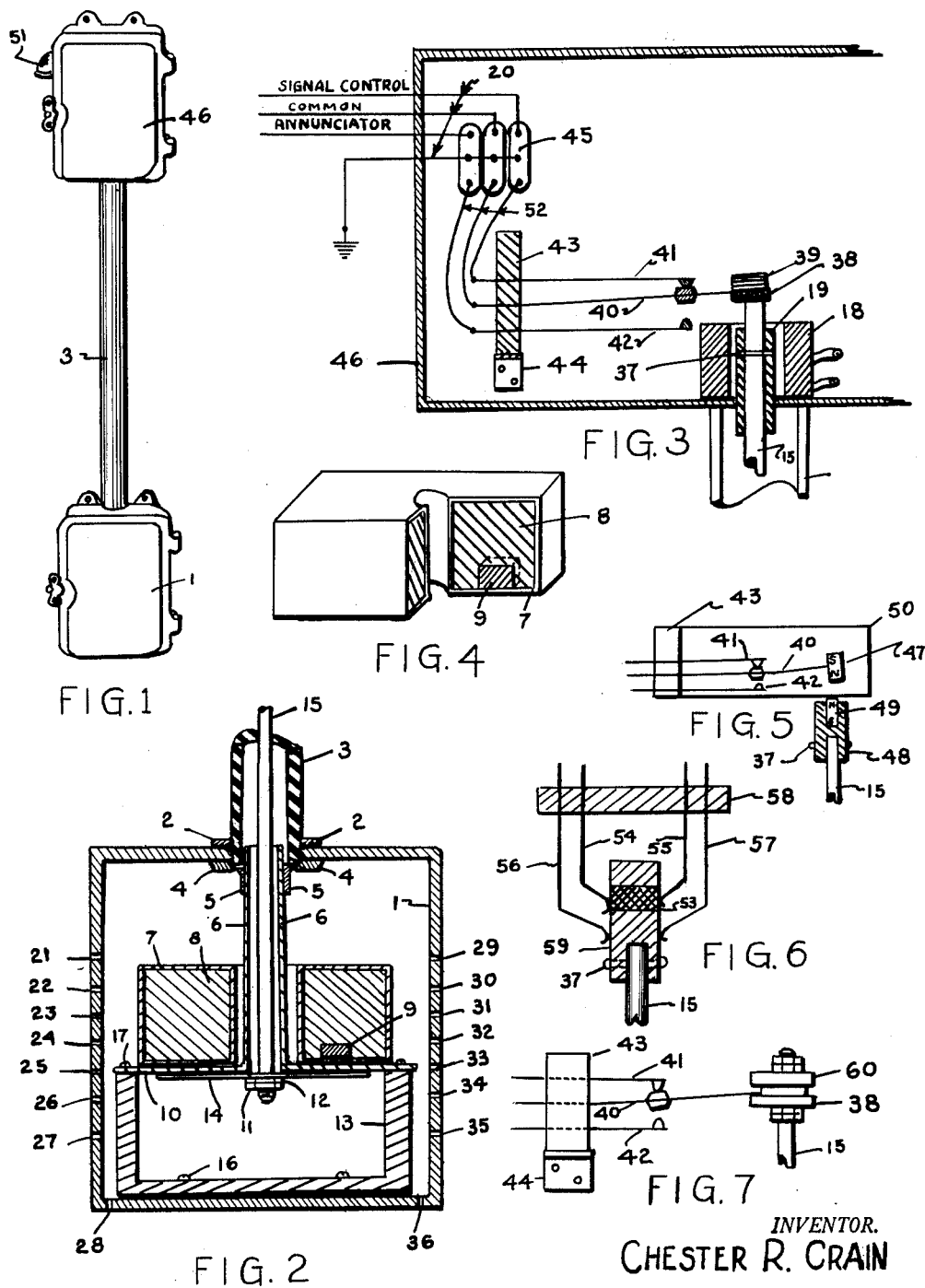

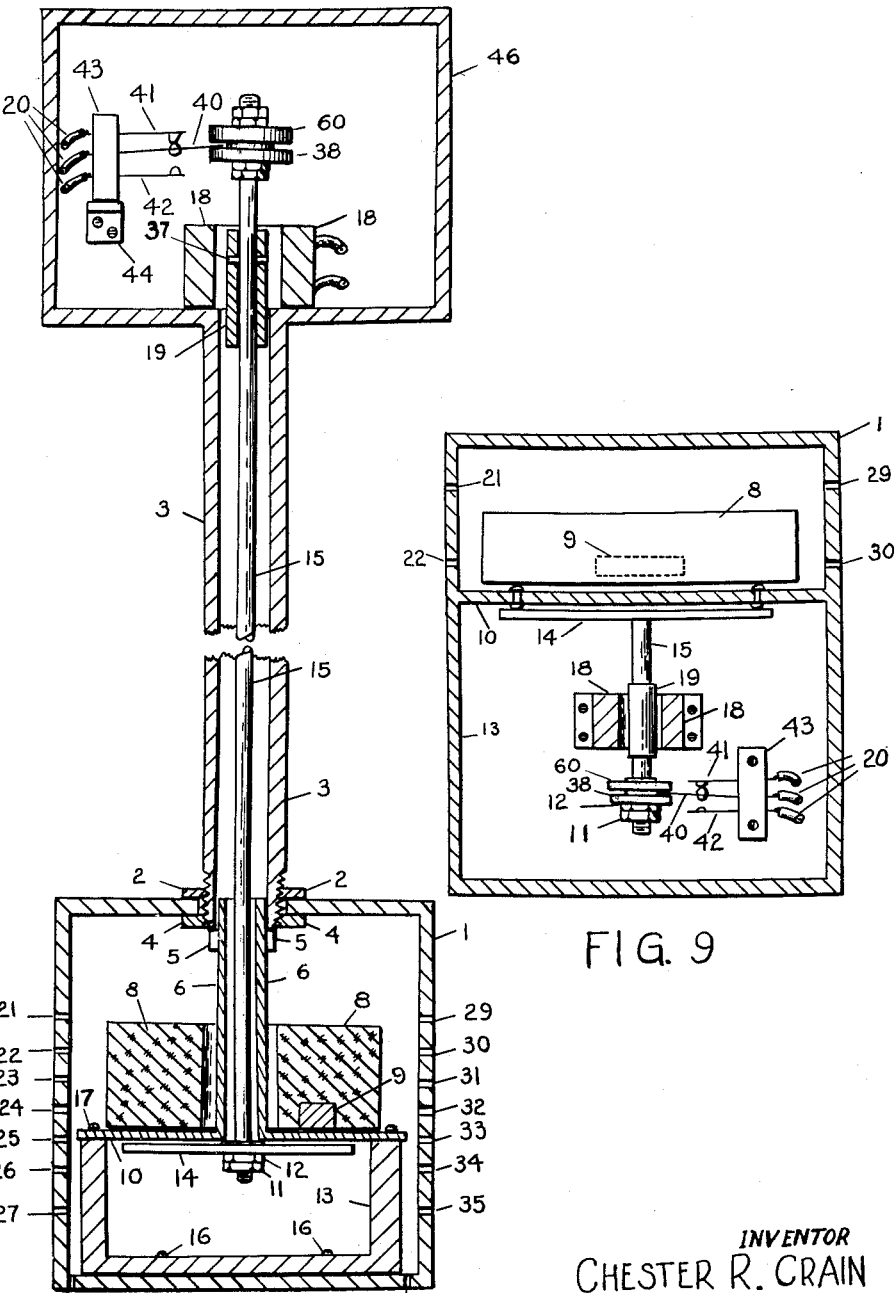

2,980,775
MAGNETIC STICK HIGH WATER DETECTOR

Chester R. Crain, 1216 W. 38th St., Kansas City 11, Mo.

Filed July 3, 1959, Ser. No. 825,392

4 Claims. (Cl. 200—84)

This invention relates generally to railway signaling apparatus and specifically to a new and improved high water detecting device whereby flood waters reaching a predetermined height will cause the detector to trip and operate contacts through which railway block signals, indicators or other apparatus are controlled to a more restrictive aspect, indication or position.

Although the device is designed for railroad use, it need not be so limited.

In present well known systems where a railway flood detector is used, it is customary to use a device having a float and attached operating rod which, on raising, trips a hinged table on which are mounted mercury switches that are used to open or close the required signal circuits. The use of mercury switches in the railway block signal field is not otherwise extensive in critical circuits, nor are their construction of glass and flexible wire very rugged.

It is an object of this invention to produce a "fail safe" gravity operated flood or high water detector that is held in the ready or set position by magnetic pull and released when the holding magnetic attraction is surpassed and exceeded by the combined forces of gravity, acting on the operating rod assembly, and the buoyancy, in water, of a freely floating float assembly.

It is an object of this invention to provide a device without linkage or pivoted members that might be subject to "false clear" failure due to the corroding of pins or hinges.

It is an object of this invention to allow use of a float unit free from any attached rods or rocker arms.

It is an object of this invention to provide an improved form of float operated electric switch in which the rod, that forces the open contacts to remain open and the closed contacts to remain closed, is free to fall due to the pull of gravity when the attraction of a permanent magnet (fixed in the float) is separated from the armature (connected to the contact operating rod) due to water rising above a predetermined level in the float housing or chamber.

Another object of this invention is to provide a device which will permit use of standard heavy duty, non-welding silver impregnated carbon front contacts, silver to silver back contacts and a heel or finger contact free to move without requiring a ribbon or flexible wire attachment.

It is an object of this invention to provide a flood detector which will permit the use of various tested and proven contacts familiar to the railroad block signaling art.

It is an object of this invention to permit use of contacts so fixed that all leads to them remain stationary during operation of the device.

Another object of this invention is to permit adaptation so that totally enclosed magnetic contacts can be used if so desired.

It is an object of this invention to obtain a downward movement of the contact operating rod in spite of the water's raising the float upward. This motion is obtained without linkage or mechanical attachment to the float.

It is an object of this invention to provide a high water or flood detecting device of high integrity in which the moving members are not subject to freezing or corroding or sticking or hanging in their normal or set position due to long disuse between testing or actuation by high water.

Another object of this invention is to provide a device permitting air tight, water proof, vapor proof, insect proof sealing of the float chamber or housing from the contact housing. This separation of the two housings is accomplished without resorting to the use of rocker shaft, bushing, packing gland, stuffing box or bearing.

It is an object of this invention to provide a flood detector which will not automatically reset itself when the flood or high waters recede below the predetermined point at which the device actuated.

It is an object of this invention that the flood detecting device must be reset manually.

It is an object of this invention to provide a means for the addition of a solenoid or other electro-magnet and appurtenances, so the detector may be reset by remote control if so desired.

It is an object of this invention to provide a design which will permit adaptation to commercially available boxes or cases for the contact and float housings and yet provide a complete vapor tight separation of the two housings, one from the other.

Other objects of this invention are a design to permit raising the contact housing above the foreseeable maximum water level and use of gravity and magnetic attraction in lieu of springs or connecting rods.

Further objects and features of this invention will be apparent to those skilled in the art from the accompanying drawings, in which like reference characters designate corresponding parts throughout the several views, and in which:

Fig. 1 is a general view of a high water detector constructed in accordance with the invention.

Fig. 2 is an enlarged sectional detail of the float housing and contained units.

Fig. 3 is an enlarged sectional detail of the contact housing and contained units.

Fig. 4 is view of the float unit with a quarter section cut out.

Fig. 5 is an enlarged sectional detail showing an alternate type of fully enclosed contacts and adapter for attaching a permanent magnet to the operating rod.

Fig. 6 is an enlarged sectional detail showing an alternate band type of contact arrangement.

Fig. 7 is an enlarged detail showing a pull down arrangement on the operating rod for forcing the finger contact to follow the operating rod.

Fig. 8 illustrates the preferred embodiment placing contacts above maximum water level.

Fig. 9 illustrates a submersible embodiment.

Component parts of the high water detector are as follows:

1. Float housing or chamber which if desired may be made from a commercially available box altered and adapted to meet requirements.
2. Conduit lock nut or equal, required if pipe is used for tube 3 (Fig. 2).
3. Pipe or tube, may be a separate part or permanently attached to either or both housings 1 and 46. The purpose of this tube is to protect operating rod 15 and to separate housings 1 and 46.
4. Conduit bushing or equal required if 3 is pipe.
5. Bushing for water tight connection between tubes 6 and 3. This may be a separate piece, a part of tube 6, a part of housing 1, a part of tube 3 or a caulking compound.

6. Tube, preferably non-magnetic. This acts as a housing for operating rod 15, a guide for float 8, and a water tight connection between tube 3 and separator wall 10. The tube 6 may be one piece with either tube 3 or separator wall 10 or housing 1.

7. Non-magnetic shell, sheath, crust, can, envelope, skin or housing around float block 8.

8. Float block material such as Styrofoam is preferred, but it could be any other light weight impervious material.

9. Permanent magnet inside shell 7 or fixed in block 8.

10. Non-magnetic separator. This may be a separate wall of armature housing 13 or part of housing 1, a stop or bracket. Its purpose is to provide a means for restraining the armature 14 from being pulled closer to magnet 9 or following magnet 9 when float unit 7, 8, 9, raises due to water action. This wall also completely separates the float member and water from the armature chamber. The armature chamber is bounded by housing 13 and separator 10.

11. Jam nut or equal if required to positively and permanently fix armature 14 to rod 15.

12. Nut or equal if required to positively and permanently fix armature 14 to rod 15.

13. Armature housing, water proof, attached to float housing 1 by screws 16 or equal. This housing could be a part of float housing 1.

14. Armature, soft iron or equal, fixed to operating rod 15.

15. Operating rod or plunger, preferably non-magnetic. The lower end of this rod may be fitted with a shoulder and threaded or an equal attaching method used to hold the armature 14. The upper end of the rod is used to operate the contacts.

16. Screws fastening armature housing to the float housing, not required if armature housing and float housing are one piece.

17. Screws fastening separator 10 to armature housing.

18. Optional solenoid or sucking coil (Fig. 3) fixed to contact case 46, for raising operating rod up to reset the device by applying energy from a remotely located source. This coil may be constructed to cover the sides of the operating rod, as shown, to prevent the rods being lifted by hand. Or the solenoid may be shorter to allow room for hand lifting of the rod.

19. Optional soft iron sleeve to work in conjunction with solenoid 18 as an armature attached to the operating rod.

20. Line or track wires to signal appurtenances.

21. And numbers to, and, including 36 show holes (either drilled or saw slots) in the float housing. These are for the purpose of allowing water to enter the float chamber. These holes should be small to eliminate insects and dirt as much as possible. The holes must not be in armature housing if it is a part of float case 1 and is to remain isolated from the float chamber. Location or number of holes is not critical so long as some are at, or below, the trip point and so long as sufficient water can enter the float chamber. Holes may not be required in the float housing proper if the door gasket is eliminated or slotted. Holes may be above the float unit if a marked and fixed trip point is desired.

37. Pin for holding solenoid sleeve in Figure 3 or contact magnet attachment in Figure 5 or insulating block in Figure 6. This may be a pin, rivet or bolt for holding these attachments to the operating rod 15.

38. Insulation between contact finger 40 and operating rod 15 (Figures 3 and 7). This may be attached to either the contact or rod or both. This will not be required for all types of contacts and may be altered to suit requirements.

39. Weight to give gravity return or fall to contact 40 in Fig. 3.

40. Contact. This is a moving contact sometimes called a heel, pivot, or finger contact. It follows the operating rod to make an electrical connection with either the front contact 41 or back contact 42 shown in Figures 3, 5 and 7.

41. Contact. This a front or upper contact.

42. Contact. This is a back contact.

43. Insulating block separating the contacts.

44. Bracket for mounting contacts in Figures 3 and 7.

45. Optional lightning arresters or terminals.

46. Contact housing or case. This may be a separate piece or part of tube 3. See Figures 1 and 3.

47. Finger contact magnet in Fig. 5, attached to finger contact.

48. Adapter for holding repulsion magnet 49 at end of operating rod 15.

49. Repulsion magnet. This magnet follows operating rod 15 and drives magnet 47 away from it due to repulsion of like magnetic poles.

50. Non-magnetic housing for enclosing contacts in Fig. 5. This housing or cover separates the two magnets 49 and 47.

51. Wire outlet on contact housing 46, Fig. 1.

52. Case wires in Fig. 3 between contacts and arresters.

53. Conducting sleeve or band on insulator 59, Fig. 6.

54 and 55 (Fig. 6). Contacts making through band 53 when high water detector is in "set" position.

56 and 57. Contacts in Fig. 6, open when detector is in "ready" position. These will make with band 53 when rod is caused to drop by high water.

58. Insulating block in Fig. 6, separating contacts.

59. Insulated block attached to operating rod 15 and holding band 53. See Fig. 6.

60. Insulating block, Fig. 7. Attached to operating rod 15 that forces finger contact 40 to follow the downward movement of the operating rod 15.

Operation of the magnetic stick high water detector is as follows:

The apparatus is placed in a vertical position mounted at the required height on a post or suitable support in a dry wash or other area subject to floods. Signals and/or indicators are controlled to clear position through the heel and front contact. Danger indications or controls are connected to the heel and back contacts. Suitable connections, if any are made to the remote control solenoid to allow energy to be applied to it when it is desired to reset the device.

The rod 15 is lifted manually or by remote control until the armature 14 comes into the field of float magnet 9 acting through separator 10. When the rod 15 is released it will stay or "stick" in the up position held by magnetic force, and it in turn will close and keep closed the heel and front contacts 40 and 41, Fig. 3, 5 and 7. Circuits energized through the heel and front contact will give a "No-flood" indication when the detector is in this "set" position.

When sufficient water has entered the float housing 1 through holes 21, 22, 23, 24, 25, 26, 27, 28, 29, 30, 31, 32, 33, 34, 35, and/or 36, to cause the float unit 7—8—9 to raise; armature 14 will try to follow but will be restrained by separator 10. As the float unit raises higher and higher magnet 9 will no longer be able to hold armature 14, so the armature and rod 15 will fall due to gravity. When rod 15 falls, heel contact 40 will fall away or be pulled from its connection with front contact 41, Figures 3, 5, and 7. This opens closed circuits of the signal system. Contact 40 will then make with back contact 42, Figures 3, 5, and 7 and may be used to shunt track circuits or operate annunciators.

When the water recedes and lowers the float unit back to rest on separator 10, armature 14 will be too far below magnet 9 to be attracted to it. In order to reset the detector it will be necessary to raise the rod 15 by hand or by the application of energy to the solenoid 18 in Fig. 3. Application of energy to solenoid 18 will suck its armature 19 upward. Rod 15 is attached to 19 so it will follow. When lifted high enough, magnet 9 will again hold armature 14 and the device will be ready to detect flood waters when energy is removed from solenoid 18.

While this invention has been described with particular reference to the construction shown in the drawing and while various changes may be made in the detailed construction, it shall be understood that such changes shall be within the spirit and scope of the present invention as defined by the appended claims.

What I claim is:

1. A railway block signal appurtenance for detecting rising flood waters comprising a housing divided into a float chamber and armature chamber by a horizontal non-magnetic separator, said float chamber pierced with apertures for flood water influx, means for excluding water from said armature chamber, an unattached float unit of foam-like body and embedded permanent magnet, said float confined within said float chamber but free to rise vertically from its normal resting place on aforesaid separator, a contact operating rod traversed by a magnetic armature affixed near one end, said armature suspended juxtaposed the underneath side of said separator by magnetic flux of aforesaid magnet, said flux traversing separator during period said float is continuously at-rest on separator, said rod free to fall vertically when magnetic field of said magnet is withdrawn by said float leaving normal position, extreme lower position of said armature below the influence of said magnet with said float normal, separable electrical contacts secured in alignment for finger contact to be actuated by aforesaid rod, means for electrically insulating said rod from said finger and actuating said finger.

2. A flood detector as outlined in claim 1 in which a magnetic solenoid-armature is secured to said rod and a soleonid is positioned adjacent to said solenoid-armature.

3. A flood detecting device as outlined in claim 1 with a non-magnetic tubelike passage for contact operating rod through said float and float-chamber, said passage preserving waterproof integrity of said armature chamber and producing incidental and negligible slidable-contact with said float, a contact housing, a tubelike means for holding said contact housing in alignment and providing housing for said contact operating rod.

4. A fail-safe railway signaling device for the detection of rising flood waters comprising a housing divided into a float chamber and armature chamber by a horizontal non-magnetic separator, said float chamber pierced with a plurality of small apertures for entrance of flood water, means for excluding said water from said armature chamber, a float unit of foamlike material, an embedded permanent magnet in said float unit, a contact operating rod, a magnetic armature affixed to said rod, said armature capable of suspension juxtaposed to the lower side of the aforesaid separator by magnetic flux through separator, said flux from said magnet acting on said armature only as long as float unit remains resting on upper side of separator, said rod free to fall vertically when said magnet is buoyed away from said separator, resting position of said fallen-rod placing attached armature beyond influence of said magnet, a non-magnet tubelike passageway for rod traversing float chamber with incidental contact of said float, said passageway preserving waterproof integrity of armature chamber, a contact housing, a tubelike means to hold said contact housing in alignment and provide housing for said operating rod, a means for electrically insulating said rod from electrical contacts, separable electrical contacts with finger contact aligned for actuation by said contact rod, means for securing said contact to said contact housing, electrical means to raise said operating rod.

References Cited in the file of this patent
UNITED STATES PATENTS

| | | |
|---|---|---|
| 2,142,680 | Shrode | Jan. 3, 1939 |
| 2,300,300 | Lund | Oct. 27, 1942 |
| 2,495,149 | Taylor | Jan. 17, 1950 |
| 2,666,823 | Wilson | Jan. 19, 1954 |

FOREIGN PATENTS

| | | |
|---|---|---|
| 669,932 | Great Britain | Apr. 9, 1952 |